(12) United States Patent
Teratani et al.

(10) Patent No.: US 7,229,940 B2
(45) Date of Patent: Jun. 12, 2007

(54) DENSE CORDIERITE BASED SINTERED BODY AND METHOD OF MANUFACTURING THE SAME

(75) Inventors: Naomi Teratani, Nagoya (JP); Naohito Yamada, Nagoya (JP); Hiroaki Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 120 days.

(21) Appl. No.: 11/087,541

(22) Filed: Mar. 23, 2005

(65) Prior Publication Data

US 2005/0215417 A1 Sep. 29, 2005

(30) Foreign Application Priority Data

Mar. 29, 2004 (JP) ............................ 2004-095695
Feb. 28, 2005 (JP) ............................ 2005-053154

(51) Int. Cl.
*C04B 35/195* (2006.01)
*C04B 35/443* (2006.01)
*C04B 35/185* (2006.01)

(52) U.S. Cl. ...................... 501/118; 501/119; 501/120; 501/128

(58) Field of Classification Search ............... 501/118, 501/119, 120, 128
See application file for complete search history.

(56) References Cited

U.S. PATENT DOCUMENTS

| 4,367,292 | A | * | 1/1983 | Sano et al. | ................. 501/119 |
| 4,540,621 | A | * | 9/1985 | Eggerding et al. | .......... 428/209 |
| 4,810,681 | A | * | 3/1989 | Hayakawa | .................. 501/119 |
| 4,888,314 | A | * | 12/1989 | Bernier et al. | ............. 501/119 |
| 7,037,870 | B2 | * | 5/2006 | Yamamoto et al. | ......... 501/120 |

FOREIGN PATENT DOCUMENTS

| JP | 02-026863 | 1/1990 |
| JP | 2002-321969 | 11/2002 |

OTHER PUBLICATIONS

M.A. Camerucci, et al., "Mechanical behavior of cordierite and cordierite-mullite materials evaluated by indentation techniques", Journal of the European Ceramic Society 21 (2001), pp. 1195 to 1204.

M.A. Camerucci, et al., "Sintering of cordierite based materials", Ceramics International 29 (2003), pp. 159-168).

* cited by examiner

*Primary Examiner*—Karl Group
(74) *Attorney, Agent, or Firm*—Burr & Brown

(57) ABSTRACT

A dense cordierite based sintered body is provided, containing at least 93% by mass of cordierite among crystal components present in the sintered body. The average particle diameter of the particles constituting the sintered body is 2 μm or less.

8 Claims, 3 Drawing Sheets

DENSE CORDIERITE BASED SINTERED BODY AND METHOD OF MANUFACTURING THE SAME

BACKGROUND OF THE INVENTION

1. Field of the Invention

The present invention relates to a dense cordierite based sintered body, and a method of manufacturing the dense cordierite based sintered body, particularly to a dense cordierite based sintered body having a satisfactory strength, high-temperature thermal expansion coefficient, and electric characteristic, and a method of manufacturing the sintered body.

2. Description of the Related Art

Cordierite has a small coefficient of thermal expansion, and indicates a superior characteristic, and has been used in various fields. However, it is difficult to densify cordierite, and a dense cordierite based sintered body substantially formed of cordierite only is not obtained. Therefore, a method has been proposed in which a rare earth oxide such as yttrium oxide is added to obtain a dense sintered body, but this sintered body does not have a sufficient strength.

As this sintered body, a sintered body has been described containing 93 to 99.99% by mass of cordierite and 0.01 to 7% by mass of silicon nitride, and having a porosity of 5% or less for a purpose of enhancing strength and Young's modulus (see Japanese Patent Application Laid-Open No. 2002-321969).

Moreover, a sintered body of cordierite ceramic has been described containing 0.1 to 10% by mass of samarium oxide for the purpose of improving permittivity, dielectric loss, and coefficient of thermal expansion of the cordierite based sintered body (see Japanese Patent Publication No. 6-74172). However, in the method using an additive, while the specific characteristics can be improved, the original characteristics of cordierite are impaired.

Moreover, an example has been described in which cordierite powder is sintered at a high temperature to obtain a dense article (see M. A. Camerucci, et al. "Mechanical behavior of cordierite and cordierite-mullite materials evaluated by indentation techniques", Journal of the European Ceramic Society 21 (2001) 1195 to 1204). However, in this example, since the powder is sintered at a high temperature, a glassy phase is formed. Therefore, the obtained sintered body contains a considerable amount of glassy phase, and does not indicate sufficient characteristics originally owned by cordierite.

SUMMARY OF THE INVENTION

An object of the present invention is to provide a dense cordierite based sintered body indicating the satisfactory original characteristics of cordierite, and having sufficient strength. Another object is to provide a manufacturing method capable of manufacturing a dense sintered body indicating a sufficient strength even when no additive is added.

According to a first embodiment of the present invention, a dense cordierite based sintered body is provided, containing at least 93% by mass of cordierite among crystal components present in the sintered body, and the average particle diameter of particles constituting the sintered body is 2 µm or less.

According to one aspect of the present invention, the dense cordierite based sintered body has a bending strength of 200 MPa or more. According to another aspect, the dense cordierite based sintered body has a coefficient of thermal expansion from 40 to 600° C. of $2.0 \times 10^{-6}$/K or less.

According to another aspect of the present invention, the dense cordierite based sintered body contains one type or more of crystal phases selected from the group consisting of mullite, spinel, and sapphirine. According to yet another aspect, the dense cordierite based sintered body has a glassy phase content of 5% by mass or less.

According to another aspect of the present invention, the dense cordierite based sintered body has a porosity of 2% or less.

According to a second embodiment of the present invention, a method of manufacturing a dense cordierite based sintered body is provided, comprising the steps of providing a cordierite powder having an average particle diameter of 2 µm or less as a raw material and sintering the raw material at a temperature in a range of 1350 to 1450° C.

According to one aspect of the second embodiment, the method of manufacturing a dense cordierite based sintered body further comprises a forming step of adding a binder to the cordierite powder to obtain clay, and forming the clay into a predetermined shape. The forming step is carried out by a method selected from the group consisting of pressure forming, extrusion forming and sheet forming.

According to another aspect of the second embodiment, the cordierite content in the cordierite powder is at least 93% by mass.

According to another aspect of the second embodiment, the dense cordierite based sintered body has a porosity of 2% or less.

The dense cordierite based sintered body according to the present invention indicates a satisfactory original characteristic of cordierite, and a sufficient strength. The manufacturing method according to the present invention is capable of preferably manufacturing the sintered body.

DETAILED DESCRIPTION OF THE INVENTION

Figure 1:
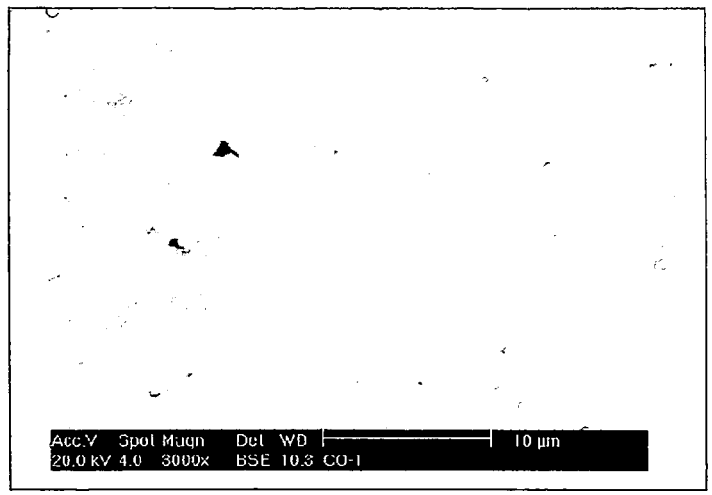
FIG. 1 is a photograph showing backscattering electron image of a fracture surface of a sintered body obtained in Example 1 by an electron microscope.

Embodiments of the present invention will be concretely described hereinafter, but it should be understood that the present invention is not limited to the following embodiments, and is appropriately changed, or improved based on the usual knowledge of a person skilled in the art without departing from the scope of the present invention.

First, a method of manufacturing a dense cordierite based sintered body according to the present invention will be described. In the embodiment, the cordierite powder that is used as a raw material can be prepared, for example, as follows.

A cordierite-forming material is fired to form cordierite. Here, "cordierite-forming material" means a raw material fired to form cordierite, and is a ceramic material in which 42 to 56% by mass of $SiO_2$, 30 to 45% by mass of $Al_2O_3$, and 12 to 16% by mass of MgO are blended in such a manner as to obtain a chemical composition in this range. Concretely, for example, a plurality of inorganic materials selected from talc, kaolin, calcined kaolin, alumina, aluminum hydroxide, and silica are contained at such a ratio as to obtain the above-described chemical composition.

Next, the formed cordierite is pulverized into cordierite powder. In this case, the average particle diameter of cordierite powder is set to 2 µm or less, preferably 1 µm or less, further preferably 0.8 µm or less. When the average particle diameter of the cordierite powder is reduced in this manner, a dense sintered body having high strength can be obtained without adding any other component. The lower limit of the average particle diameter of the cordierite powder is not especially limited. When the diameter is excessively small, pulverization becomes difficult, or the pulverizing time lengthens in some case. It is also difficult to handle the powder in some cases. Therefore, the average particle diameter is preferably 0.1 µm or more, further preferably 0.3 µm or more. It is to be noted that this average particle diameter can be measured by a laser diffraction method.

The pulverizing method is not especially limited. For example, a ball mill, an attritor, a bead mill, a jet mill and the like may be used in performing the pulverization. Additionally, in this case, the pulverization is performed under the condition that the average particle diameter can further be reduced compared to the usual conditions. For example, when a ball mill is used, the ball size used is reduced, and an appropriate viscosity or treatment time can be selected to thereby obtain a powder having a smaller average particle diameter. With the use of a ball mill which has heretofore been used generally, the pulverizing time is preferably lengthened. For example, the powder having the small average particle diameter can be obtained in about three days. It is to be noted that natural cordierite ore may also be pulverized.

The cordierite powder obtained in this manner preferably has a cordierite content of at least 93% by mass, more preferably at least 95% by mass. The cordierite content is preferably 100 mass %, but it is difficult to stably obtain the cordierite powder industrially. Therefore, the cordierite powder may contain a secondary phase to a certain degree from practical and economical viewpoints. However, it is preferred that the secondary phase does not adversely affect the characteristics of cordierite.

From the above-described viewpoint, the cordierite powder also preferably contains one or more crystal phases selected from the group consisting of mullite, spinel, sapphirine, and corundum formed of Al, Mg, Si, O. The total content of cordierite, mullite, spinel, sapphirine, and corundum in the cordierite powder is preferably at least 95% by mass, more preferably at least 99% by mass.

Moreover, Ti is preferably included in the cordierite. When Ti is included, the sinterability is enhanced. When an excessively large amount of Ti is included, the original characteristics of cordierite, such as low thermal expansion, are unfavorably inhibited. Therefore, the amount of Ti included is preferably 0.7% by mass or less, more preferably 0.5% by mass or less in oxide conversion ($TiO_2$).

Next, the obtained cordierite powder is formed into a predetermined shape. The forming method is not especially limited, and a general forming method can be used. For example, a mixture obtained by adding an organic binder to the cordierite powder is kneaded to form clay, and the clay can be formed into a predetermined shape by pressing, extrusion, sheet forming or the like. Even when no organic binder is added, the powder can be directly pressurized and formed into the predetermined shape. The formed shape is not especially limited, and may be various shapes in accordance with the respective application. For example, a disc shape, a plate shape or the like may be formed.

A sheet forming method is carried out under predetermined conditions after making a mixture in a pot by sufficiently mixing, for example, cordierite powder, a binder, a dispersing agent, a plasticizer and a solvent, and arranging the viscosity of the mixture. If necessary, a sheet-like formed body having a desired thickness can be laminated and obtained by thermocompression bonding or CIP (cold isostatic press).

Next, the obtained formed body is heated and degreased. It is to be noted that the degreasing is unnecessary in cases where the body is formed without using any organic binder. Thereafter, the body is further heated and sintered. In this case, the sintering temperature, that is, the maximum temperature is important. When the sintering temperature is excessively low, the powder particles are not mutually sintered sufficiently, and sufficient strength is not obtained. On the other hand, when the temperature is excessively high, a large amount of vitreous materials are generated, pores are enlarged, the strength drops, and other characteristics of the cordierite are impaired. In particular, the coefficient of thermal expansion increases. Therefore, the sintering temperature needs to be in a range of 1350 to 1450° C., more preferably in a range of 1375 to 1425° C.

The retention time at the maximum sintering temperature is not especially limited, and a person skilled in the art can appropriately select the time in consideration of the shape or size of the formed body, the characteristics of the heating furnace and the like. Concrete retention time at a preferable maximum temperature is, for example, 1 to 12 hours, more preferably 2 to 8 hours. The sintering atmosphere is not especially limited, and suitable examples include an air atmosphere, an inert atmosphere like nitrogen atmosphere or argon atmosphere, and a reducing atmosphere like hydrogen atmosphere or mixed atmosphere of hydrogen and nitrogen.

Additionally, sintering of the formed body using a binder under an inert atmosphere or a reducing atmosphere, without sintering or degreasing in an air atmosphere, is preferably carried out under a humidified atmosphere for degreasing the formed body.

Next, an embodiment of a dense cordierite based sintered body according to the present invention which can be obtained by the above-described manufacturing method will be described.

This sintered body contains at least 93% by mass of cordierite, preferably 94% by mass or more, and more preferably 95% by mass or more. Moreover, the average particle diameter of sintered particles is 2 µm or less, preferably 1 µm or less, and more preferably 0.8 µm or less.

Accordingly, this sintered body satisfactorily exhibits the original characteristics of cordierite, especially a high-temperature coefficient of thermal expansion and electric characteristics and has a high strength. It is to be noted that cordierite is sometimes classified into low-temperature type cordierite and high-temperature type cordierite (also referred to as indiarite) in some cases, but cordierite in the present invention includes not only low-temperature type cordierite but also high-temperature type cordierite.

In this sintered body, the cordierite content is preferably higher. However, the sintered body may contain a secondary phase to a certain degree in consideration of productivity or the like. In this case, the secondary phase is preferably mullite, spinel, or sapphirine from the viewpoint that the cordierite characteristics are not largely adversely affected. Therefore, this sintered body also preferably contains one or more types of crystal phases selected from the group consisting of mullite, spinel, and sapphirine. In this case, the total content of cordierite, mullite, spinel, and sapphirine in the sintered body is preferably 95% by mass or more, more preferably 99% by mass or more.

Moreover, the sintered body may contain a small amount of a glassy phase. However, when the glassy phase content is excessively large, the coefficient of thermal expansion increases, or other characteristics of cordierite are lowered. Therefore, the glassy phase content is preferably less than 5% by mass, more preferably 1% by mass or less. It is to be noted that a glass component is first detected usually at 5% by mass or more in XRD measurement.

Moreover, for the reason that the sinterability is enhanced, Ti is preferably included in cordierite. The amount of included Ti is preferably 0.7% by mass in terms of oxide, more preferably 0.5% by mass.

The average particle diameter of the particles which constitute the sintered body increase or decrease depending on the average particle diameter of the cordierite powder, when appropriate sintering conditions are selected. Therefore, for manufacturing reasons, the average particle diameter of the particles which constitute the sintered body is preferably 0.1 μm or more, more preferably 0.3 μm or more. It is to be noted that as to the average particle diameter, from an electron microscope photograph of a sample which is polished into a mirror surface and whose grain boundary is emphasized by thermal etching, the cordierite particles are observed, and the diameter is calculated as an average of 30 particles.

The porosity of this sintered body is preferably 2% or less, more preferably 1.5% or less, and especially preferably 1% or less. When the porosity is lower, the strength and insulation destructive characteristics are further enhanced, and the sintered body is preferably used, for example, as a dielectric electrode, or a member for as a semiconductor manufacturing apparatus.

This sintered body has a high strength, and the strength can be set in accordance with the application and shape of the sintered body in consideration of productivity. Concretely, the bending strength is preferably 200 MPa or more, more preferably 210 MPa or more, and remarkably preferably 230 MPa or more. It is to be noted that the strength can be adjusted by controlling the average particle diameter, sintering temperature, sintering time and the like of the cordierite powder.

The coefficient of thermal expansion of this sintered body is preferably $2.0 \times 10^{-6}$/K or less, further preferably $1.8 \times 10^{-6}$/K or less. It is to be noted that here the coefficient of thermal expansion means an average coefficient of thermal expansion from 40 to 600° C. At this coefficient of thermal expansion, the sintered body can sufficiently bear practical use even under high temperature exposure use conditions.

In this sintered body, when the Young's modulus is high, the strength is enhanced. However, when the Young's modulus is excessively high, the resistance to thermal shock lowers. Therefore, the Young's modulus is preferably 100 to 180 GPa. The dielectric constant is preferably 5 or less. The heat transfer ratio is preferably 10 W/mK or less, more preferably 5 W/mK or less. The insulation destructive strength is preferably 10 kV/mm or more, more preferably 15 kV/mm or more.

To obtain a sintered body having characteristics in the above-described range, a small amount of components influencing the characteristics are preferably contained. Examples of the components include silicon nitride, a rare earth oxide and the like. The amount of silicon nitride is preferably less than 0.01% by mass, and more preferably less than 0.005% by mass. The content of rare earth oxide is preferably less than 0.1% by mass, and more preferably less than 0.01% by mass. Furthermore, it is especially preferred that silicon nitride or a rare earth oxide are not substantially contained.

EXAMPLES

The present invention will be described hereinafter in more detail in accordance with examples, but the present invention is not limited to the examples.

Example 1

Cordierite obtained by sintering a cordierite-forming material was pulverized, and cordierite powder having an average particle diameter of 0.7 μm was obtained. The obtained powder was pressed by a uniaxial mold, and a formed body was obtained. The obtained formed body was held at a temperature of 1400° C. in a nitrogen atmosphere for 12 hours, and a sintered body was obtained. The sintered body was tested as follows, and the results are shown in Table 1.

The average particle diameter (μm) measurement of the sintered particles was obtained by the above-described measurement method.

The bulk density (g/cm³) measurement was obtained by the Archimedes method.

The crystal phase was determined by an X-ray diffraction system. The measurement conditions were CuKα, 50 kV, 300 mA, 2θ=5–80° in a rotating anode type X-ray diffraction system ("RINT" manufactured by Rigaku Denki).

The component content (mass %) measurement was made using zinc oxide as an internal standard, and the crystal component content was obtained from the strength ratio of an X-ray diffraction peak of each crystal component.

The porosity percentage was obtained from the bulk density, and the theoretical density calculated from the content of each crystal phase of the sintered body in the following equation. It is to be noted that the theoretical density was calculated assuming that sapphirine had a density equal to that of spinel:

Total porosity (%)=(1−bulk density/theoretical density)×100.

The open porosity (%) was obtained by Archimedes method.

The bending strength (MPa) was measured using a four-point bending strength test in conformity to JIS R1601. A test piece shape was measured as a 3 mm×4 mm×40 mm transverse rod, or ½ size. Here, the term "measured in ½ size" means that the bending strength is measured when the shape of the test piece is set to ½ size of each side of the transverse rod, and also means that both the distance between lower supporting points and the distance between upper loading points of four-point bending are set to ½ size. Moreover, a thin plate obtained by sheet forming was set with a sheet thickness (approx. 1 mm)×2 mm×20 mm, and the bending strength was calculated using the Weibull modulus obtained by the measured values.

The Weibull modulus was obtained in conformity with JIS R1625 and applied to the following formula to calculate the bending strength at the above-mentioned ½ size:

$$\frac{\sigma_1}{\sigma_2} = \left(\frac{V_{e2}}{V_{e1}}\right)^{1/m}.$$

Here, σ is the breaking stress, $V_e$ is the effective volume, and m is the Weibull modulus. Moreover, the effective volume is represented by the following formula:

$$V_e = \frac{wh}{2(m+1)^2}(mS_2 + S_1).$$

Here, w is a width of the test piece, h is a height, $S_1$ is the distance between lower supporting points, $S_2$ is the distance between upper loading points and m is the Weibull modulus.

The Young's modulus (GPa) was measured by a static deflection method in conformity with JIS R1.602. The test piece shape was measured as a 3 mm×4 mm×40 mm transverse rod.

The coefficient of thermal expansion (/K) was measured in a pushrod differential system in conformity with JIS R1618.

The heat transfer ratio (W/mK) was measured by laser flash method in conformity with JIS R1611.

The dielectric constant was measured using a method in conformity with JIS C2141. The test piece had a 50 mm×50 mm×1 mm square plate shape, and each electrode was formed by sputtering evaporation of gold so as to obtain a main electrode diameter of 14 mm, a guard electrode inner diameter of 16 mm, a guard electrode outer diameter of 22 mm, and an applied electrode diameter of 22 mm.

The insulation destructive strength (kV/mm) was measured by a method in conformity with JIS C2141. The test piece had a 45 mm×45 mm×1 mm square plate shape, and the pressure was raised at 1 kV/second.

The volume resistivity (Ω·cm) was measured in a vacuum atmosphere at room temperature to 700° C. using a method in conformity with JIS C2141. The test piece was a φ35 mm×1 mm disc shape, or a 50 mm×50 mm×1 mm square plate shape, and each electrode was formed of silver so as to obtain a main electrode diameter of 10 mm, a guard electrode inner diameter of 20 mm, a guard electrode outer diameter of 30 mm, and an applied electrode diameter of 30 mm. The applied voltage was set to 500 V/mm, the current was read one minute after applying the voltage, and the volume resistivity was calculated.

TABLE 1

| | |
|---|---|
| Average particle diameter of sintered particles (μm) | 0.7 |
| Bulk density (g/cm³) | 2.54 |
| Content (mass %) | Cordierite: 97.6 |
| | Mullite: 0.3 |
| | Spinel + sapphirine: 2.1 |
| Total porosity (%) | 0.1 |
| Open porosity (%) | 0.0 |
| 4-point bending strength (MPa) | 230 |
| Young's modulus (GPa) | 150 |
| Coefficient of thermal expansion (/K) | $1.6 \times 10^{-6}$ |
| Heat transfer ratio (W/mK) | 4.4 |
| Dielectric constant | 4.8 |

TABLE 1-continued

| | |
|---|---|
| Insulation destructive strength (kV/mm) | 21 |
| Volume resistivity (Ω·cm) | |
| Room temperature | $2.0 \times 10^{15}$ |
| 600° C. | $1.5 \times 10^{10}$ |

Examples 2 to 14 and Comparative Examples 1 and 2

Figure 2:
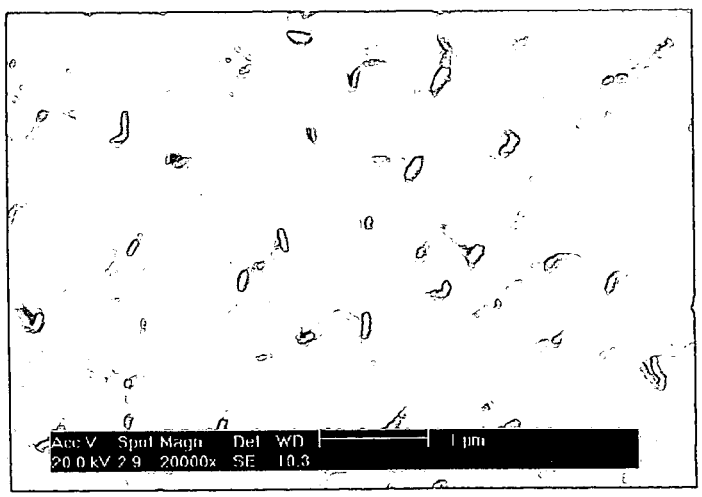
FIG. 2 is a photograph showing secondary electron image after thermally etching a polished surface of the sintered body obtained in Example 1.
Figure 3:
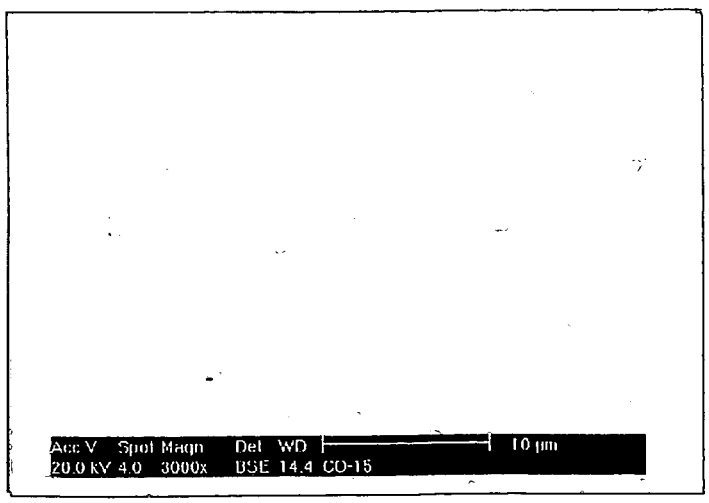
FIG. 3 is a photograph showing backscattering electron image of the fracture surface of the sintered body obtained in Example 11.
Figure 4:
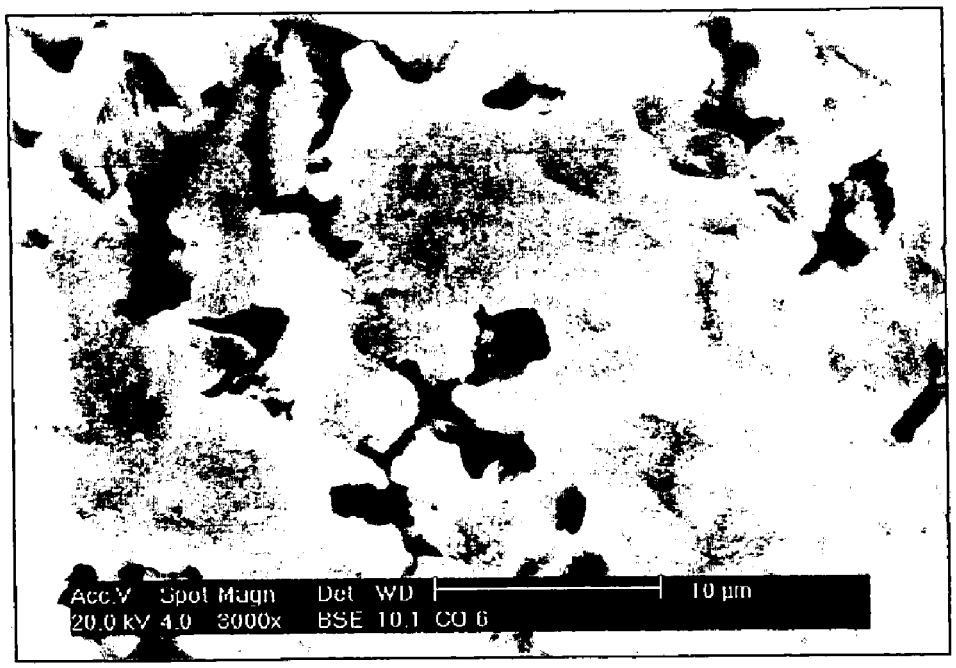
FIG. 4 is a photograph showing backscattering electron image of the fracture surface of the sintered body obtained in Comparative Example 1.
Figure 5:
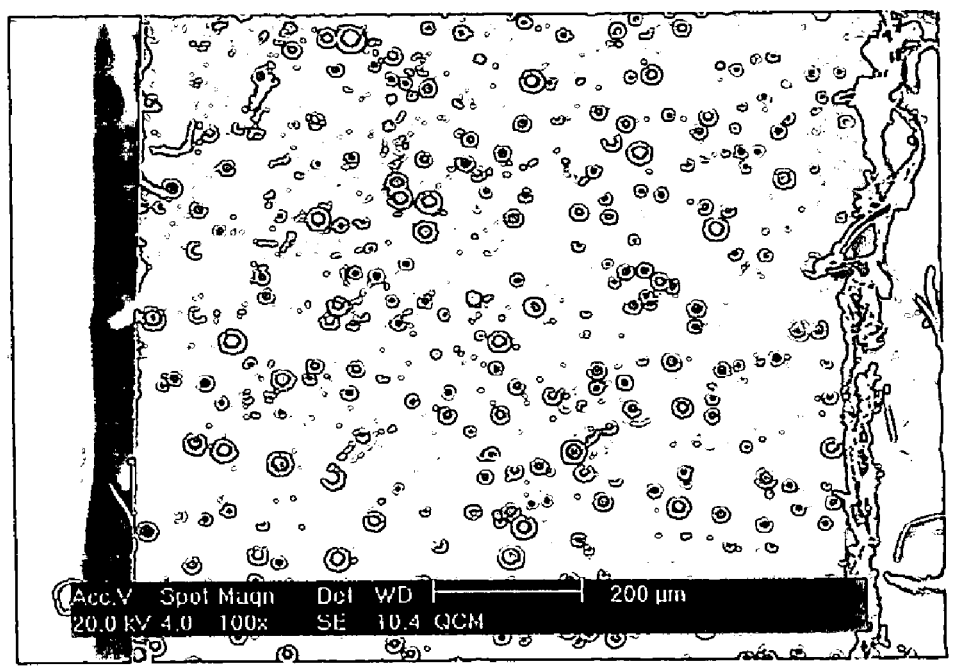
FIG. 5 is a photograph showing backscattering electron image of the fracture surface of the sintered body obtained in Comparative Example 2.
Figure 6:
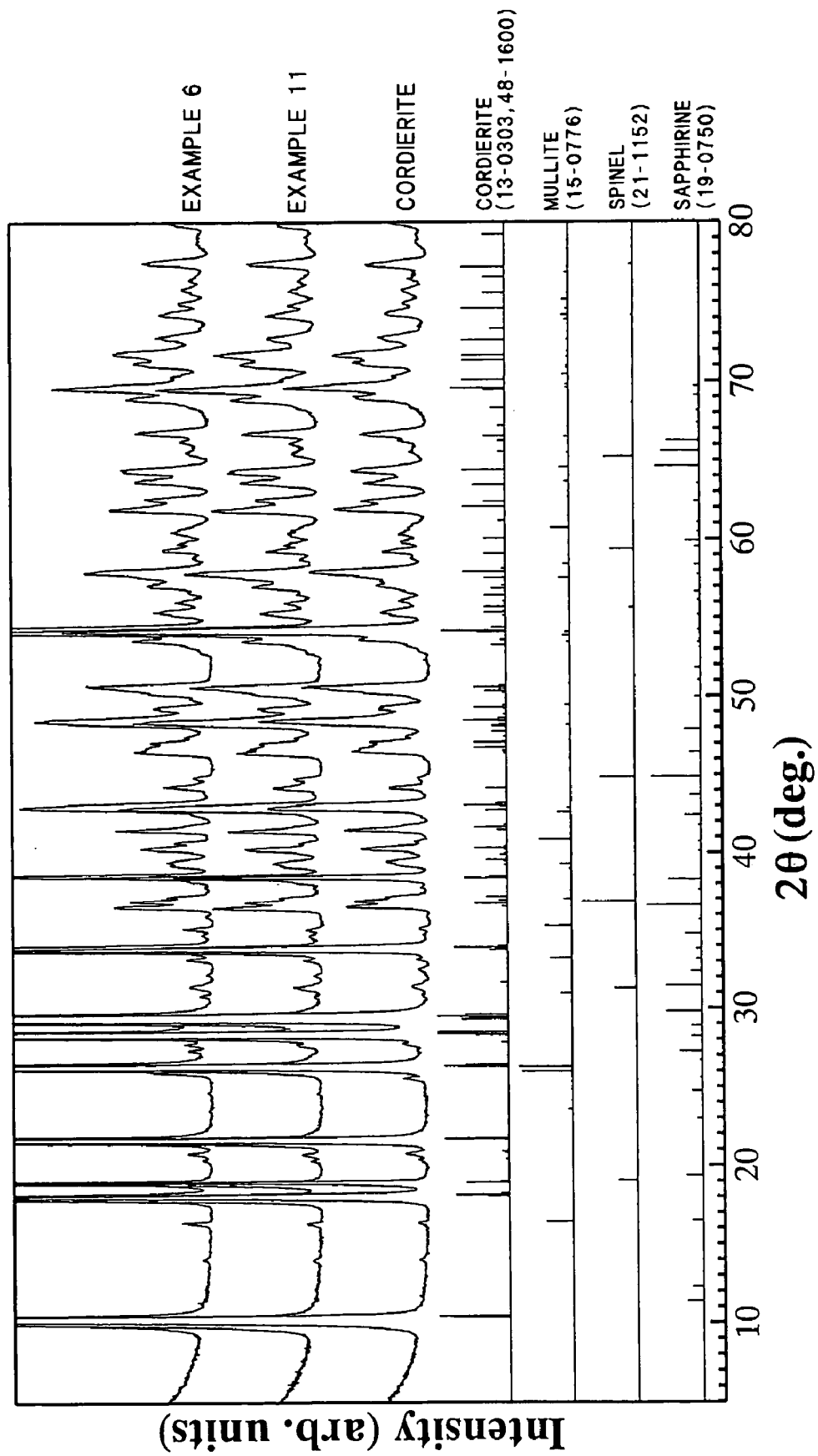
FIG. 6 is a diagram showing X-ray diffraction pattern profiles of sintered bodies obtained in Examples 6 and 11.

As Examples 2 to 14, sintered bodies were obtained in the same manner as in Example 1 except that the average particle diameter of cordierite powder was set to 0.5 to 1.8 μm, and the sintering conditions were as shown in Table 2. As Comparative Example 1, a sintered body was obtained in the same manner as in Example 1 except that the average particle diameter of the cordierite powder was 6.5 μm, and the sintering conditions were as shown in Table 2. As Comparative Example 2, a sintered body was obtained in the same manner as in Example 1 except that the average particle diameter of the cordierite powder was 0.5 μm, and the sintering conditions were as shown in Table 2. Evaluation results of the obtained sintered bodies are shown in Table 2. A backscattering electron image of a fracture surface of the sintered body obtained in Example 1 is shown in FIG. 1, a secondary electron image obtained after thermally etching a polished surface of the sintered body is shown in FIG. 2, a backscattering electron image of the fracture surface of the sintered body obtained in Example 11 is shown in FIG. 3, a backscattering electron image of the fracture surface of the sintered body obtained in Comparative Example 1 is shown in FIG. 4, and an backscattering electron image of the fracture surface of the sintered body obtained in Comparative Example 2 is shown in FIG. 5. It is to be noted that the average particle diameter of the particles which constitute the sintered body was calculated based on the image shown in FIG. 2.

Examples 15 to 17

In Examples 15 to 17, the average particle diameter of cordierite powder was set to 1.5 μm. Formed bodies were obtained by sheet forming after making a mixture in a pot by mixing sufficiently the above-described cordierite powder, a binder, a dispersing agent, a plasticizer and a solvent, and arranging the viscosity of the mixture. Next, firing conditions were as shown in Table 2, and a sintered body was obtained. In addition, in Examples 16 to 17, sintering is carried out in a mixed atmosphere of hydrogen and nitrogen under a humidified atmosphere for degreasing the formed bodies. The same conditions as in Example 1 were applied except for the above described conditions. Evaluation results of the obtained sintered bodies are shown in Table 2.

TABLE 2

| | Average particle diameter of powder (μm) | Maximum Temperature (° C.) | Retention Time (h) | Sintering Atmosphere | Average particle diameter of sintered particles (μm) | Bulk Density (g/cm³) | Total Porosity (%) | 4-point bending strength (MPa) | Content Cordierite (%) | Mullite (%) | Spinel + Sapphirine (%) |
|---|---|---|---|---|---|---|---|---|---|---|---|
| Example 2 | 0.6 | 1375 | 2 | Air | 0.6 | 2.52 | 1.5 | 205 | 94.2 | 3.9 | 1.9 |
| Example 3 | 0.5 | 1375 | 4 | Air | 0.5 | 2.54 | 0.5 | 228 | 94.0 | 4.1 | 1.8 |
| Example 4 | 0.6 | 1375 | 8 | Air | 0.6 | 2.54 | 0.9 | 219 | 93.6 | 4.1 | 2.4 |
| Example 5 | 0.5 | 1400 | 2 | Air | 0.5 | 2.54 | 0.9 | 239 | 93.8 | 4.4 | 1.9 |

TABLE 2-continued

| | Average particle diameter of powder (μm) | Maximum Temperature (° C.) | Retention Time (h) | Sintering Atmosphere | Average particle diameter of sintered particles (μm) | Bulk Density (g/cm³) | Total Porosity (%) | 4-point bending strength (MPa) | Content Cordierite (%) | Mullite (%) | Spinel + Sapphirine (%) |
|---|---|---|---|---|---|---|---|---|---|---|---|
| Example 6 | 0.5 | 1400 | 4 | Air | 0.5 | 2.53 | 1.1 | 214 | 93.4 | 4.4 | 2.2 |
| Example 7 | 0.6 | 1400 | 8 | Air | 0.6 | 2.53 | 0.7 | 220 | 94.0 | 4.0 | 2.0 |
| Example 8 | 0.6 | 1425 | 2 | Air | 0.6 | 2.53 | 1.6 | 203 | 94.0 | 4.0 | 2.0 |
| Example 9 | 0.5 | 1425 | 4 | Air | 0.5 | 2.52 | 1.3 | 202 | 93.5 | 4.0 | 2.5 |
| Example 10 | 0.5 | 1425 | 8 | Air | 0.6 | 2.52 | 1.3 | 207 | 94.3 | 3.6 | 2.1 |
| Example 11 | 0.5 | 1400 | 12 | $N_2$ | 0.6 | 2.52 | 0.4 | 200 | 95.9 | 3.5 | 0.6 |
| Example 12 | 0.7 | 1400 | 12 | $N_2$ | 0.7 | 2.53 | 0.4 | 230 | 96.8 | 0.9 | 2.3 |
| Example 13 | 1.0 | 1400 | 12 | $N_2$ | 1.0 | 2.51 | 0.3 | 201 | 98.5 | 1.5 | 0.0 |
| Example 14 | 1.8 | 1400 | 12 | $N_2$ | 1.1 | 2.49 | 1.0 | 200 | 98.5 | 1.5 | 0.0 |
| Example 15 | 1.5 | 1400 | 4 | Air | 0.8 | 2.52 | 0.2 | 267 | 97.2 | 1.3 | 1.5 |
| Example 16 | 1.5 | 1375 | 2 | $H_2/N_2$ | 0.8 | 2.48 | 1.7 | 241 | 97.6 | 0.2 | 2.2 |
| Example 17 | 1.5 | 1350 | 2 | $H_2/N_2$ | 0.7 | 2.48 | 1.9 | 234 | 97.3 | 0.7 | 2.0 |
| Comparative Example 1 | 6.5 | 1400 | 12 | $N_2$ | 6.6 | 2.12 | 16.5 | 66 | 96.3 | 2.4 | 1.2 |
| Comparative Example 2 | 0.5 | 1470 | 2 | Air | 0.6 | 2.42 | 4.5 | 170 | 95.6 | 4.2 | 0.1 |

As shown in Table 2 and FIGS. 1 to 5, the sintered bodies obtained in Examples 1 to 17 had a small sintered particle diameter and contained a small amount of components other than cordierite crystals, and the sintered bodies had satisfactory coefficients of thermal expansion electric characteristics, and strengths. On the other hand, the sintered body obtained in Comparative Example 1 had a large sintered particle diameter, and a large total porosity, and further indicated a lower strength. When the sintering temperature was set at about 1400° C., a sintered body indicating a higher strength was obtained. Furthermore, since the sintered body obtained in Comparative Example 2 had small sintered particles, but an excessively high sintering temperature, a large number of huge pores were generated, and the strength dropped.

INDUSTRIAL APPLICABILITY

As described above, since a dense cordierite based sintered body according to the present invention exhibits satisfactory strength, a high-temperature coefficient of thermal expansion, and satisfactory electric characteristics, the sintered body can be used in various applications. This sintered body can especially be used in applications requiring satisfactory electric characteristics and strength, applications involving rapid temperature changes, or in high temperature applications that are required to have predetermined strength, such as a dielectric electrode, and as a member for a semiconductor manufacturing apparatus. According to the method of manufacturing a dense cordierite based sintered body of the present invention, the sintered body can be preferably manufactured.

What is claimed is:

1. A dense cordierite sintered body comprising at least 93 mass % of a cordierite crystal phase and including a spinal crystal phase, wherein an average particle diameter of particles of the sintered body is 2 μm or less.

2. The dense cordierite sintered body according to claim 1, having a bending strength of 200 MPa or more.

3. The dense cordierite sintered body according to claim 1, having a coefficient of thermal expansion from 40 to 600° C. of $2.0 \times 10^{-6}$/K or less.

4. The dense cordierite sintered body according to claim 1, wherein the sintered body further includes a mullite crystal phase.

5. The dense cordierite sintered body according to claim 1, having a content of a vitreous component of 5 mass % or less.

6. The dense cordierite sintered body according to claim 1, having a porosity of 2% or less.

7. The dense cordierite sintered body according to claim 1, further comprising sapphirine crystal phase.

8. The dense cordierite sintered body according to claim 7, wherein the spinel crystal phase and the sapphirine crystal phase are present in an amount of at least 0.6 mass %.

* * * * *

UNITED STATES PATENT AND TRADEMARK OFFICE
CERTIFICATE OF CORRECTION

PATENT NO. : 7,229,940 B2  Page 1 of 1
APPLICATION NO. : 11/087541
DATED : June 12, 2007
INVENTOR(S) : Naomi Teratani, Naohito Yamada and Hiroaki Sakai It is certified that error appears in the above-identified patent and that said Letters Patent is hereby corrected as shown below:

Column 10

*Line 32*: please change "spinal" to --spinel--

Signed and Sealed this

Thirty-first Day of July, 2007

JON W. DUDAS
*Director of the United States Patent and Trademark Office*